United States Patent [19]
Gagnon et al.

[11] 4,425,028
[45] Jan. 10, 1984

[54] HIGH EFFICIENCY OPTICAL TANK FOR THREE COLOR LIQUID CRYSTAL LIGHT VALVE IMAGE PROJECTION WITH COLOR SELECTIVE PREPOLARIZATION AND SINGLE PROJECTION LENS

[75] Inventors: Ralph J. Gagnon, Chico; Robert T. Carson, Fullerton, both of Calif.

[73] Assignee: Hughes Aircraft Company, El Segundo, Calif.

[21] Appl. No.: 334,682

[22] Filed: Dec. 28, 1981

[51] Int. Cl.³ .............................................. G02F 1/13
[52] U.S. Cl. ............................... 350/337; 350/331 R; 350/345; 350/394; 353/31; 358/61
[58] Field of Search ................... 358/331 R, 395, 342, 358/345, 401, 403, 408, 394; 353/37, 36, 34, 31; 358/60, 61

[56] References Cited

U.S. PATENT DOCUMENTS

| | | | |
|---|---|---|---|
| 2,403,731 | 4/1943 | MacNeille | 350/395 X |
| 2,958,258 | 11/1960 | Kelly et al. | 358/61 X |
| 3,463,575 | 12/1966 | Gates | 350/394 X |
| 3,497,283 | 2/1970 | Law | 350/408 |
| 4,127,322 | 11/1978 | Jacobson et al. | 350/342 X |
| 4,191,456 | 3/1980 | Hong et al. | 350/342 X |
| 4,345,258 | 8/1982 | Tsai et al. | 353/31 X |

Primary Examiner—John K. Corbin
Assistant Examiner—David Lewis
Attorney, Agent, or Firm—William J. Benman, Jr.; William J. Bethurum; Anthony W. Karambelas

[57] ABSTRACT

A full color high contrast image projection system with oil coupled dichroics and a single projection lens is disclosed. The invention includes a unitary optical tank in which a prepolarizer and dichroic separators are mounted in fixed alignment relative to a main polarizing prism. The prepolarizer acts on the incident light from a source to polarize the green light and reflect the S component out of the system. The red and blue components are transmitted unchanged. The main polarizer is mounted at a 90° twist relative to the prepolarizer so that it reflects the green light to a first light valve via a first dichroic separator. The polarized red and blue components are transmitted to second and third light valves via a second dichroic separator. The light valves modulate the polarization state of incident light before returning it to the second beamsplitter. The second beamsplitter then recombines the individual beams into a single output beam. This beam is projected by a telecentric projection lens to provide a full color high contrast image.

4 Claims, 1 Drawing Figure

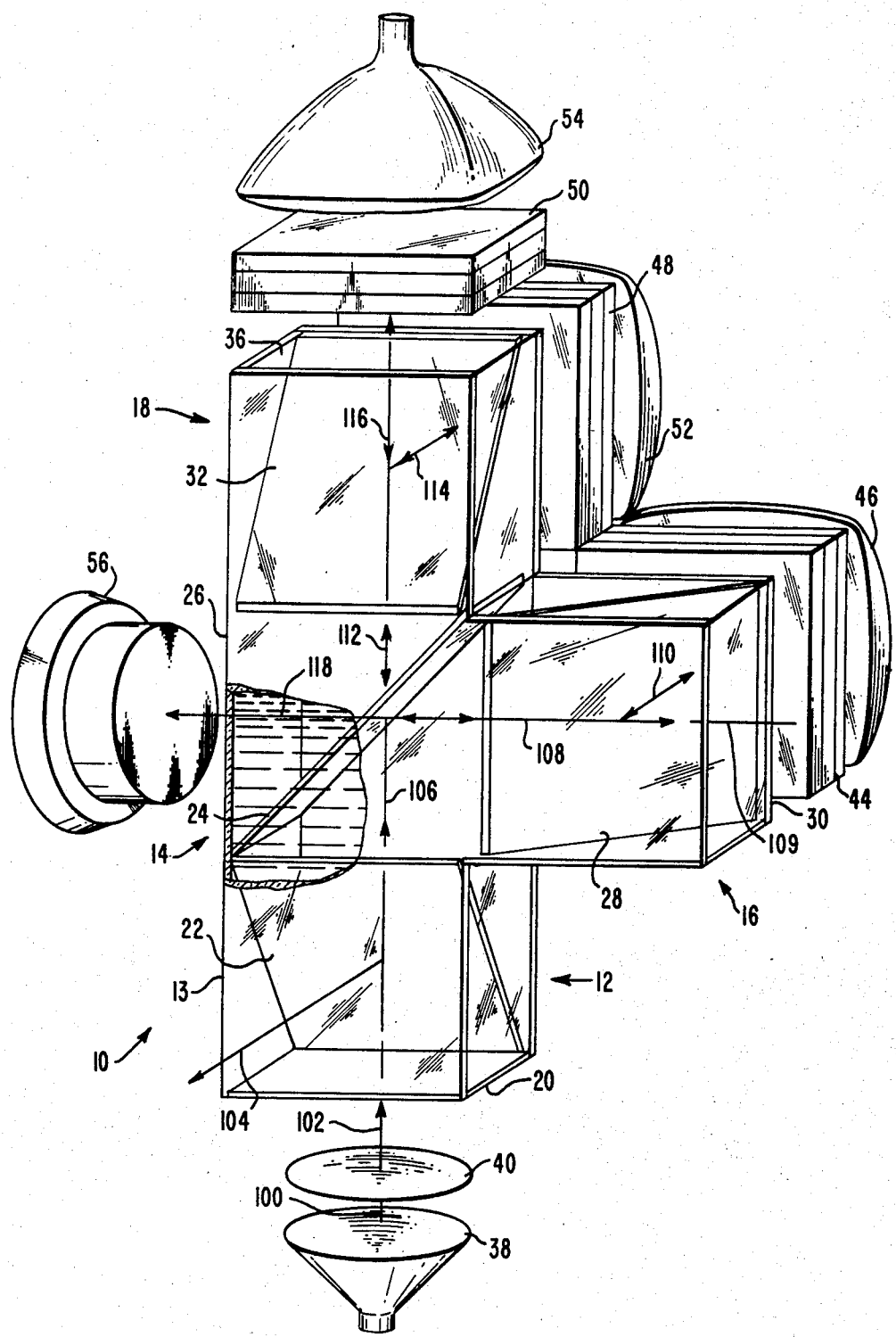

HIGH EFFICIENCY OPTICAL TANK FOR THREE COLOR LIQUID CRYSTAL LIGHT VALVE IMAGE PROJECTION WITH COLOR SELECTIVE PREPOLARIZATION AND SINGLE PROJECTION LENS

BACKGROUND OF THE INVENTION 1. Field of the Invention

This invention relates to liquid crystal light valve (LCLV) projectors. Specifically, this invention relates to three color liquid crystal light valve projectors with oil coupled dichroics.

While the present invention will be described herein with reference to a particular embodiment, it is to be understood that the invention is not limited thereto. Those having ordinary skill in the art and access to the teachings of this invention will recognize additional embodiments within the scope thereof. 2. Description of the Prior Art The development of the liquid crystal light valve has opened the door to substantial progress in the state of the art of high quality large screen projectors. The reflective mode liquid crystal light valve is a thin film, multilayer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube, is applied to the photoresponsive layer thereby switching the electric field across the electrodes from the photoresponsive layer onto the liquid crystal layer to activate the liquid crystal. Linearly polarized projection light passing through the liquid crystal layer and reflecting from the dielectric mirrors is polarization-modulated in accordance with the information incident on the photoconductor. Therefore, if a complex distribution of light, for example, a high resolution input image, is focused onto the photoconductor surface, the device converts the image into a replica which can be projected with magnification to produce a high brightness image on a viewing screen. U.S. Pat. No. 4,019,807 issued to D. D. Boswell et al on Apr. 26, 1977 disclosed such a high performance reflective mode liquid crystal light valve.

A graphics display projector using a liquid crystal light valve of the above-type is described in an article entitled "Application of the Liquid Crystal Light Valve to a Large Screen Graphics Display", published in the 1979 *Society for Information Display* (SID), International Symposium, Digest of Technical Papers, May 1979, pp. 22-23. This display system, a type with which the present invention is particularly but not exclusively concerned, projects a large scale image having yellow-white characters on a dark blue background. The system includes a cathode ray tube (CRT) which provides input imagery; projection optics which provide the bright collimated output beam and necessary light polarization; and the liquid crystal light valve which interfaces the input and output function.

The system uses a powerful light source such as a xenon arc lamp to illuminate the liquid crystal light valve through collimating the polarizing optics. Light emitted from the xenon arc lamp is transmitted to a main polarizing prism where it is separated into S and P components. The P component passes through the prism while the S component is reflected toward the light valve. Information displayed by the cathode ray tube is transferred by fiber optics to one side of the light valve which changes the polarization state from S to P. The light is then transmitted through the prism and imaged on a screen by projection lens. In this capacity, the main prism functions as an analyzer, converting modulations of polarization to modulations of brightness or intensity.

The quality of the projected image is generally a function of brightness, resolution and contrast. Image quality can generally be improved by placing a prepolarizing prism in the optical path in front of the main polarizing prism. The prepolarizing prism is somewhat effective in overcoming the deficiencies in the main polarizing prism. That is, since the main polarizing prism is not 100% effective in transmitting light of one polarization and reflecting light of another, light of an undesirable polarization may reach the light valve and be modulated and reflected back through the main prism onto the projection lens. This often results in distortions of color and/or reductions in contrast and resolution.

Since the prepolarizing prism may, for reasons of cost, be of the same design as the main prism, it would typically have similar reflectance and transmittance characteristics. However, when the two prisms are used in combination, the additive effect is such as to greatly improve the quality of the projected image. The prepolarizing prism substantially removes light of one polarization from the beam which illuminates the main prism. The main prism then acts on the light of the beam to substantially remove the residual light of the undesirable polarization state.

However, in some applications it is desirable to use a second liquid crystal light valve for enhanced information displaying capability and versatility. In this application, the use of the prepolarizing prism becomes problematic insofar as the second light valve would require light of the polarization that would otherwise be removed by the prepolarizing prism. As a result, the use of a second light valve forces a compromise in the quality of the projected image.

This problem was addressed by the Applicants and Roy Cedarstrom and Ralph Gagnon in a copending application serial number 334,679 entitled "Two-Color Liquid Crystal Light Valve Image Projection System with Single Prepolarizer". It provides a color selective prepolarization of the light incident upon two or more light valves. This is accomplished by use of a prepolarizing prism which acts on light from a light source to direct light of a first polarization to a first dichroic separator and light of a second polarization to a second dichroic separator. The resulting beams are recombined in a dichroic adder prior to being applied to a second polarizing prism. The second polarizing prism directs light of a first color and polarization to a first light valve and light of a second polarization to a second light valve in the conventional manner.

This system, though effective, is bulky insofar as in the best mode, each prism is essentially a small tank with an optical thin film layer immersed in glass or oil. The system of the copending application requires air coupling to immersed beamsplitters. The resulting arrangement requires much attention to the proper alignment of the components while offering less than optimal performance. It is known that the coupling of the beamsplitters through oil would improve the performance of this system.

U.S. Pat. No. 4,191,456 issued on Mar. 4, 1980 to Hong et al and U.S. Pat. No. 4,127,322 issued on Nov. 28, 1978 to Jacobson et al are exemplary of full color image projection systems utilizing air coupling and a plurality of liquid crystal light valves.

SUMMARY OF THE INVENTION

The present invention substantially overcomes the shortcomings of the prior art and provides full color, high contrast image projection with a relatively simply designed, inexpensive oil coupled optical arrangement with a single projection lens.

The invention provides a unitary structure in which first and second color selective polarizing beamsplitters and first and second dichroic separators are mounted.

The first color selective polarizing beamsplitter is a prepolarizer. It is effective in splitting light from the source into first and second beams, the first beam being primarily green S polarized light and the second beam consisting of red and blue S polarized light as well as red, blue and green P polarized light.

The second color selective polarizing beamsplitter is the main prism. It is mounted in the optical path of the second beam to reflect the red, green, and blue P polarized light from the prepolarizer as S polarized light and to transmit the red and blue S polarized light from the prepolarizer as P polarized light. The reflected S and transmitted P polarized beams provide the third and fourth beams respectively.

A first dichroic separator is mounted in the optical path of the third beam. It extracts the green S polarized light from the red and blue S polarized light and directs it to a first light valve.

A second dichroic separator is mounted in optical alignment with the fourth beam. It separates the red and blue components of the P polarized beam into fifth and sixth beams. The fifth beam is then directed to a second light valve while the sixth beam is directed to a third light valve.

The light valves modulate the polarization state of incident light in accordance with the input of writing light from cathode ray tubes in a conventional manner. The polarization modulated light is returned through the dichroic separators to the main prism where the third and fourth beams are recombined and transmitted to conventional projection optics.

BRIEF DESCRIPTION OF THE DRAWINGS

The FIGURE is a perspective view of a diagrammatic representation of a preferred embodiment of the present invention.

DESCRIPTION OF THE INVENTION

As shown in the FIGURE, the invention 10 is a unitary structure made of glass or other suitably transparent material. While the preferred embodiment is constructed to contain optical grade oil, it is understood that the invention may be made of solid glass or other suitably transparent material.

As shown in the FIGURE, the invention includes four cubic sections 12, 14, 16 and 18. The lower section 12 includes a planar lower surface 20 which provides an input aperture. While it is not critical to this invention, it is understood that an ultraviolet filter may be coated on surface 20 if desired.

A first color selective polarizing beamsplitter 22 is also mounted in the lower section 12 at a 45° angle relative to the surface 20. The beamsplitter 22 provides color selective prepolarization. It is constructed of glass or other suitably transparent material. It has an optical thin film coating which is effective in polarizing the green light only, reflecting the S and transmitting the P, while transmitting the S and P components of the red and blue light. The coating includes fifteen sets of layers each set having a first layer 0.731 quarter wavelength in depth with an index of refraction of 1.6, a second layer 1.313 quarter wavelengths in depth with an index of refraction of 1.8 and a third layer 0.731 quarter wavelength in depth with an index of refraction of 1.6. These layers are constructed at an optical thickness $\lambda$ equal to 550 nanometers for incidence at 0°. With this coating, the first polarizing beamsplitter 22 is a green prepolarizer. In the preferred embodiment the green prepolarizer is coated for optimum performance in oil with an index of refraction of 1.65.

A second color selective polarizing beamsplitter 24 is mounted in the second section 14. It serves as the main prism. Like the first prepolarizer 22, the second polarizer 24 is mounted at a 45° angle relative to incident light. Note however that its transverse axis is normal or perpendicular to that of the first beamsplitter 22. Thus light which is S polarized as to the first beamsplitter 22 is P polarized as to the second beamsplitter 24. Similarly, light which is P polarized as to the first beamsplitter 22 is S polarized as to the second beamsplitter 24.

The beamsplitter 24 is designed to reflect S polarized light and transmit P polarized light. It has an optical thin film coating which is designed for performance in oil having an index of refraction of 1.65. The thin film coating includes a first layer 1.557 quarter wavelengths in depth with an index of refraction of 2.05. Five sets of layers are coated on this first layer. Each set includes a first layer 0.994 quarter wavelength in depth with an index of refraction 1.35, a second layer 1.157 quarter wavelengths in depth with an index of refraction of 2.32 and a third layer 0.994 quarter wavelength in depth with an index refraction of 1.35. Over these five sets of layers are provided a final layer 1.557 quarter wavelengths in depth with an index of refraction 2.05. This construction is at an optical thickness $\lambda$ equal to 500 nanometers at an incident angle of 0°. In general, the coatings are provided on glass or other suitably transparent material having a thickness designed to meet specific application. In the preferred embodiment the thickness of the glass is between one eighth and one quarter of an inch.

The third section 16 includes a first dichroic separator or filter 28 for reflecting green light while transmitting red and blue. This first dichroic separator 28 is mounted so that light is incident from the second beamsplitter 24 at a 45° angle. It is designed for operation in oil having an index of refraction of 1.65. It is coated with a thin film coating including 15 sets of layers each set having a first layer 0.731 quarter wavelength in depth and having an index of refraction of 1.6, a second layer 1.157 quarter wavelengths in depth and having an index of refraction 2.32 and a third layer 0.731 quarter wavelength in depth and having an index of refraction of 1.6. These sets of layers are coated with 15 sets of layers each set having a first layer of thickness 0.760 quarter wavelength in depth with an index of refraction of 1.6, a second layer 1.203 quarter wavelengths in depth with an index of refraction of 2.32 and a third layer 0.760 quarter wavelength in depth with an index of refraction of 1.6. This construction is at an optical thickness λ equal to 535 nanometers for an incident angle of 0°.

The third section 16 also includes a substantially transparent apertures 30. Aperture 30 is a light valve exit window. The fourth section 18 includes a second dichroic separator 32 which is effective to reflect red light and transmit blue light of the P polarization state. It is mounted in optical alignment with the fourth beam as transmitted by the second beamsplitter 24. It is mounted at a 45° angle relative to the incident beam. It has an optical thin film coating design 20 for operation in oil having an oil and index of refraction of 1.62. The coating has 15 sets of layers each set having a first layer 0.717 quarter wavelength in depth and having an index of refraction of 1.6, a second layer 1.15 quarter wavelengths in depth and having an index of refraction of 2.32, and a third layer 0.717 quarter wavelengths in depth and having an index of refraction of 1.6. These layers are coated with 15 sets of layers each set having a first layer 0.746 quarter wavelength in depth with an index of refraction of 1.6 and a second layer 1.196 quarter wavelengths in depth with an index of refraction 2.32 and a third layer 0.746 quarter wavelength in depth with an index of refraction of 1.6. This construction is at an optical thickness λ equal to 625 nanometers for an incident angle of 0°. With these coatings, the red light is effectively reflected to aperture 32, a second light valve exit window, which is at the rear surface of the fourth section 18. The blue light is transmitted to aperture 34, a third light valve exit window, which is at the top surface of the fourth section 18. Many of the above-described optical coatings were designed and performance evaluated by the Thin Film computer program provided as a service by the Genesee Company of Rochester N.Y..

In operation, a high powered light source 38 and a collimating lens 40 are mounted to illuminate the surface input aperture 20 with a beam of collimated unpolarized white light 102. The light passes through the input aperture 20 and is incident on the first color selective beamsplitter or prepolarizer 22 at a 45°angle. The color selective prepolarizer 22 removes the green S polarized light 104 from the system by directing it to an optical dump not shown. While the first beamsplitter 22 reflects a first green S polarized beam 104 from the system, it transmits a second beam 106 including red and blue S polarized light and red, blue and green P polarized light to the second polarizing beamsplitter 24. This beamsplitter is used as a main beamsplitter and substantially reflects the incident P polarized light as S polarized light while transmitting the incident S polarized light as P polarized light. Thus the red, green and blue components of the incident P polarized component of the second beam are reflected in a third beam 108 to the first (green) dichroic separator 28. The green dichroic separator 28 acts as a green filter. It substantially transmits the red and blue components 109 out of the system in much the same manner as discussed above with regard to the first polarizing beamsplitter 22, while reflecting the green S polarized light 110 through the second aperture 30 to a first liquid crystal light valve 44. The liquid crystal light valve 44 modulates the polarization state of the green S polarized light in accordance with the presence of writing light from a cathode ray tube 46 in a conventional manner. The light valve returns polarization modulated light to the green dichroic separator 28 where it is reflected back to the second polarizing beamsplitter 24.

As mentioned above, the second polarizing beamsplitter 24 transmits a fourth beam 112 consisting essentially of red and blue P polarized light to a second dichroic separator 32. The red, blue dichroic separator 32 reflects the red light in the fourth beam as a fifth beam 114 through aperture 34 to a second liquid crystal light valve 48. The blue light is transmitted as a sixth beam 116 through aperture 36 to a third liquid crystal light valve 50. Light valves 48 and 50 modulate the polarization state of incident light in accordance with writing light provided by cathode ray tubes 52 and 54 respectively. Polarization modulated light is returned by each light valve 48 and 50 to the dichroic separator 32. The dichroic separator 32 combines the polarization modulated light from each light valve into a single beam which is transmitted to the second polarizing beamsplitter 24. The second polarizing beamsplitter 24 recombines the outputs of the liquid crystal light valves into a single beam which 118 is transmitted through the output aperture 26 to a conventional telecentric projection lens 56. The telecentric projection lens subsequently projects a full color image on an appropriate surface (not shown).

While the present invention has been described herein with reference to a preferred embodiment and a particular application, it is understood that those having ordinary skill in the art and access to the teachings of this invention will recognize additional embodiments and applications within the scope thereof. It is therefore contemplated by the appended claims to cover any and all such modifications.

What is claimed is:

1. A unitary optical arrangement comprising:

a first color selective polarizing beamsplitter for splitting light from a source into first and second beams, said first beam consisting essentially of a first color and a first polarization state and said second beam consisting of second and third colors having the first polarization state and the first second and third colors having the second polarization state;

a second color selective polarizing beamsplitter for splitting said second beam into said third and fourth beams, said third beam consisting of essentially light of the first polarization state and said fourth beam consisting essentially of light of the second and third colors and the second polarization state;

a first dichroic separator for filtering said third beam, extracting said first color component and directing it to said first light valve; and a second dichroic separator for filtering said fourth beam and directing said second color component to said second light valve and directing said third color component to said third light valve.

2. A unitary optical arrangement for use in a multicolor image projection system including a source of light energy, three light valves, three cathode ray tubes, and a projection lens;

said arrangement comprising:

a first color selective polarizing beamsplitter for splitting light from a source into first and second beams, said first beam consisting essentially of a first color and a first polarization state and said second beam consisting of second and third colors having the first polarization state and the first, second and third colors having the second polarization state;

a second color selective polarizing beamplitter for splitting said second beam into third and fourth beam, said third beam consisting essentially of light of the first polarization state and said fourth beam consisting essentially of light of the second and third colors and the second polarization state;

a first dichroic separator for filtering said third beam, extracting said first color component and directing it to said first light valve;

a second dichroic separator for filtering said fourth beam and directing said second color component to said second light valve and directing said third color component to said third light valve, whereby first, second, and third substantially monochromatic polarization modulated beams are returned from said light valves and said first and second dichroic separators respectively to said second beamsplitter for recombination into a signal fifth beam which is directed thereby to said projection lens.

3. The optical arrangement of claim 1 or 2 wherein the first and second polarizing beamsplitters have transverse verse axes and each is mounted so that the beamsplitter transverse axes are oriented at a relative 90° angle.

4. The optical arrangement of claim 3 wherein the beamsplitters and separators are coupled through oil.

* * * * *